(12) United States Patent
Galtsev et al.

(10) Patent No.: US 10,250,605 B2
(45) Date of Patent: Apr. 2, 2019

(54) COMBINING A SET OF RISK FACTORS TO PRODUCE A TOTAL RISK SCORE WITHIN A RISK ENGINE

(71) Applicant: Quest Software Inc., Aliso Viejo, CA (US)

(72) Inventors: Sergey Galtsev, Chandler, AZ (US); Laci Szentendrei, Mesa, AZ (US); Jeff Rohan, Phoenix, AZ (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 507 days.

(21) Appl. No.: 14/870,470

(22) Filed: Sep. 30, 2015

(65) Prior Publication Data

US 2017/0093863 A1 Mar. 30, 2017

(51) Int. Cl.
*G06Q 10/00* (2012.01)
*H04L 29/06* (2006.01)

(52) U.S. Cl.
CPC .......... *H04L 63/10* (2013.01); *H04L 63/1433* (2013.01); *H04L 63/20* (2013.01)

(58) Field of Classification Search
CPC ......... G08B 21/06; G08B 21/02; G10L 17/26; H04M 2201/41; H04M 2203/6027; H04M 3/36; H04M 3/385; H04M 2201/40; H04M 3/5166; H04M 3/5233; H04L 63/10; H04L 63/1433; H04L 63/20
See application file for complete search history.

(56) References Cited

U.S. PATENT DOCUMENTS

| 8,601,531 B1* | 12/2013 | Zolfonoon | G06F 21/604 713/182 |
| 2009/0070188 A1* | 3/2009 | Scott | G06Q 10/0635 705/7.28 |
| 2012/0259752 A1* | 10/2012 | Agee | G06Q 40/00 705/35 |
| 2015/0234999 A1* | 8/2015 | Hu | G16H 50/30 705/2 |

* cited by examiner

*Primary Examiner* — Abiy Getachew
(74) *Attorney, Agent, or Firm* — Kirton McConkie; Brian Tucker

(57) ABSTRACT

A risk engine can be configured to produce a total risk score by combining a set of risk factors. A risk policy can define a percentage that is to be assigned to each risk factor that is present in a request to access a web-accessible application. The percentage can represent the amount of risk that can be attributed to the access request when the risk factor is present in the request. The risk policy can also define which mitigating factors apply to each risk factor. Each mitigating factor can also be assigned a percentage by which the mitigating factor will reduce the risk factor when the mitigating factor and risk factor are present in the access request. The risk factors can then be combined to produce the total risk score. The total risk score can be generated as a percentage between 0% and 100%.

17 Claims, 7 Drawing Sheets

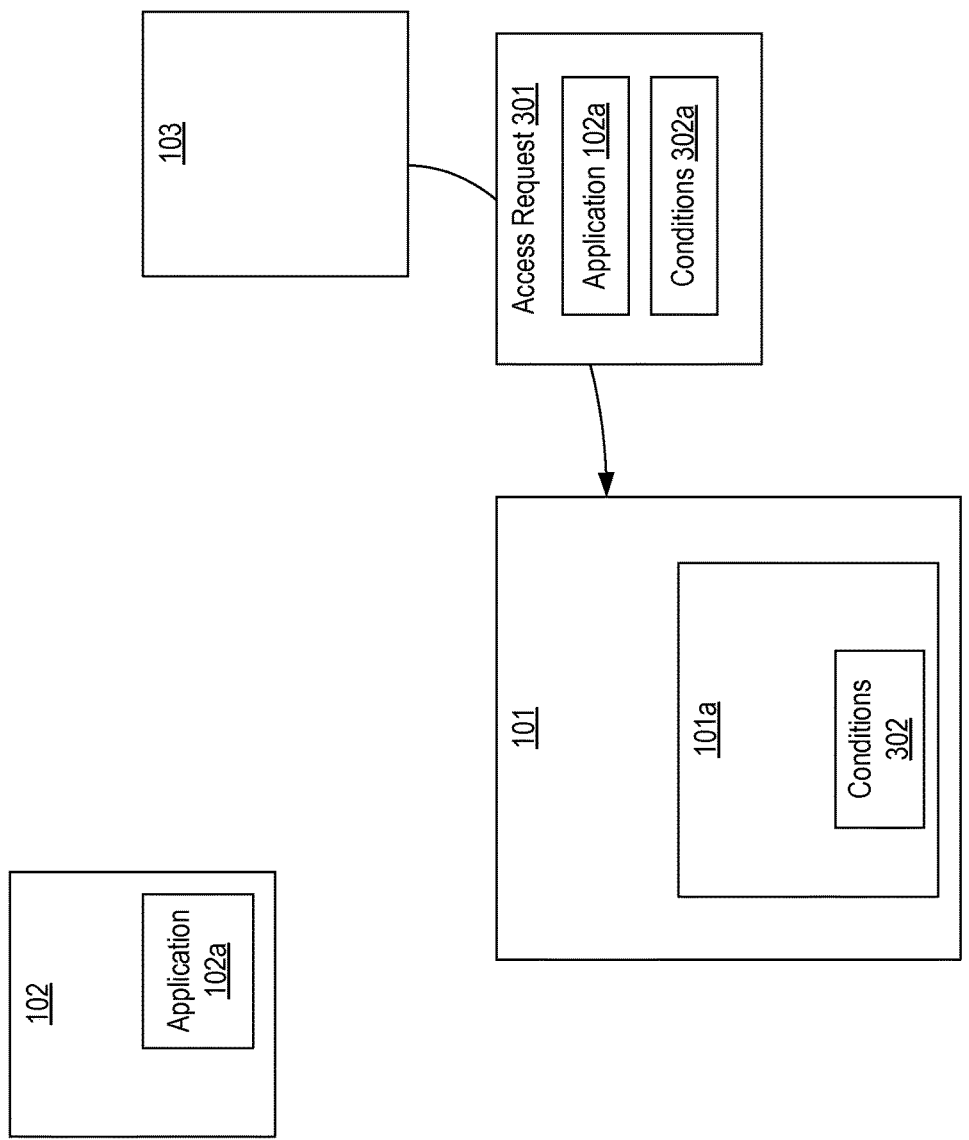

COMBINING A SET OF RISK FACTORS TO PRODUCE A TOTAL RISK SCORE WITHIN A RISK ENGINE

CROSS-REFERENCE TO RELATED APPLICATIONS

N/A

BACKGROUND

A risk engine is a tool used by an application to perform adaptive authorization to control access to the application. A risk engine employs a risk policy to customize authorization requirements to minimize the risk that a malicious user may gain access to the application.

When a user attempts to access an application which uses a risk engine, the application requests that the risk engine evaluate the attempt against the applicable risk policy to determine the risk of allowing the user to access the application. In some cases, this evaluation involves generating a risk score by combining scores of a number of conditions. For example, a risk engine could generate a risk score by combining a score generated based on a time when the access is attempted, a score generated based on an IP address from which the access is attempted, and a score generated based on a location from which the attempt originates. The risk engine can then return the risk score to the application to allow the application to decide whether to allow the access.

In some cases, an access manager, of which the risk engine may be a part, may be employed to manage a number of applications. In such cases, the access manager, rather than the application, may interface with the risk engine. For example, the access manager may be configured to receive a user's request to access an application and may employ the risk engine to evaluate the access request including determining whether to grant the access based on a risk score returned by the risk engine.

In either case, in such prior art systems, the risk score that is generated by the risk engine does not always adequately reflect the actual risk of the access attempt. Such prior art systems, and the risk score methodologies they employ, are also not intuitive, making it more difficult for administrators to properly configure their applications (including an access manager) to use the risk score. The present invention is therefore directed to a new and intuitive methodology for combining a set of risk factors to produce a total risk score that more accurately reflects this actual risk.

BRIEF SUMMARY

The present invention extends to methods, systems, and computer program products for combining a set of risk factors to produce a total risk score within a risk engine. A risk engine can provide an interface or other means of allowing an administrator to define a risk policy for a particular application. This risk policy can comprise a percentage that is assigned to each risk factor representing the amount of risk that can be attributed to an access request when the risk factor is present in the request. The risk policy can also define which mitigating factors apply to each risk factor including by defining a percentage by which the mitigating factor will reduce the risk factor when the mitigating factor and risk factor are present in an access request. Once all risk factors that are present in an access request are determined and their associated percentages are obtained, the risk factors can be adjusted based on any applicable mitigating factors. The risk factors can then be combined to produce the total risk score. The risk factors can be combined in a manner that yields a total risk score as a percentage between 0% and 100%.

In one embodiment, the present invention is implemented as a method performed by a risk engine that is configured to evaluate attempts to access a web-accessible application. In response to a request to access the application, a number of conditions about the request are determined. Based on the conditions, it is identified which of a number of risk factors and mitigating factors are present in the request. A risk policy that is applicable to the request is identified. Based on the risk policy, a percentage is assigned to each of the risk factors that are present in the request. For each risk factor for which the risk policy defines that one or more of the mitigating factors apply, the percentage assigned to the risk factor is adjusted by a percentage assigned to the one or more mitigating factors. The percentage assigned to each risk factor is combined to produce a total risk score. Then, the total risk score is transmitted to the application or to an access manager that manages access to the application to allow the application or the access manager to determine whether to allow the request to access the application In another embodiment, the present invention is implemented as a risk engine that includes one or more processors and one or more computer storage media. The computer storage media store a risk policy for a first application that is managed by the risk engine. The risk policy identifies a number of risk factors and a percentage that is assigned to each of the risk factors. The risk policy further identifies, for at least one of the risk factors, one or more mitigating factors that apply to the risk factor and a percentage that is assigned to each of the one or more mitigating factors. The computer storage media also stores rules for identifying, for each of at least some requests to access the first application, whether any of the risk factors or mitigating factors are present within the request. The computer storage media further stores computer executable instructions configured to generate a total risk score for the at least some requests to access the first application by: identifying conditions of the request; applying the rules to the conditions to identify which risk factors and mitigating factors are present within the request; applying the risk policy to the identified risk factors and mitigating factors such that the corresponding percentage is assigned to each risk factor, and the percentage assigned to each risk factor is modified by the corresponding percentage assigned to any mitigating factor that applies to the risk factor; and combining the percentages assigned to each risk factor to generate the total risk score as a percentage that represents the risk of authorizing the request.

In another embodiment, the present invention is implemented as a method for generating a total risk score. A browser-based request to access a web-accessible application is received from a user computing device. The request is evaluated to determine whether to authorize the request, the evaluation including: (1) identifying a number of risk factors, the risk factors including: whether the request was submitted using an abnormal browser; whether the request was submitted at an abnormal time; and whether the request was submitted from an abnormal location; (2) identifying a number of mitigating factors, the mitigating factors including: whether the request was received from a whitelisted IP address; and whether strong authentication was employed in conjunction with the request; (3) accessing a risk policy to identify a percentage of risk to be applied to each identified risk factor, a percentage of mitigation to be applied to each mitigating factor, and to which risk factors any of the mitigating factors apply; (4) for any risk factor to which any of the mitigating factors apply, reducing the percentage assigned to the risk factor using the percentage assigned to any mitigating factor that applies; and (5) combining the percentages assigned to the risk factors to generate a total risk score as a percentage representing a total risk of authorizing the request.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 3A illustrates an example of how an access request can be evaluated when a risk engine is part of an access manager;

DETAILED DESCRIPTION

In this specification, a risk engine should be construed as a tool that evaluates attempts to access a web-accessible application to determine whether such attempts should be allowed. An example of a risk engine is Dell Inc.'s Security Analytics Engine. Because web-accessible applications can be accessed from virtually anywhere in the world (e.g., via browser-based access), a company may employ a risk engine to ensure that only legitimate users can access the applications. Examples of web-accessible applications include internally hosted applications (e.g., an email application, a company directory, an internal database, etc.) as well as external or cloud-based applications (e.g., Salesforce.com, Google Apps service, Microsoft Office 365, etc.).

For purposes of this specification, the primary role of the risk engine is to evaluate the risk of authorizing a particular access attempt. It is noted that this process is related to, but different from, an authentication process. For example, even if a particular access attempt includes the submission of proper user credentials, the risk engine may still determine that the risk of authorizing the access is too great and may therefore block the access.

Figure 1:
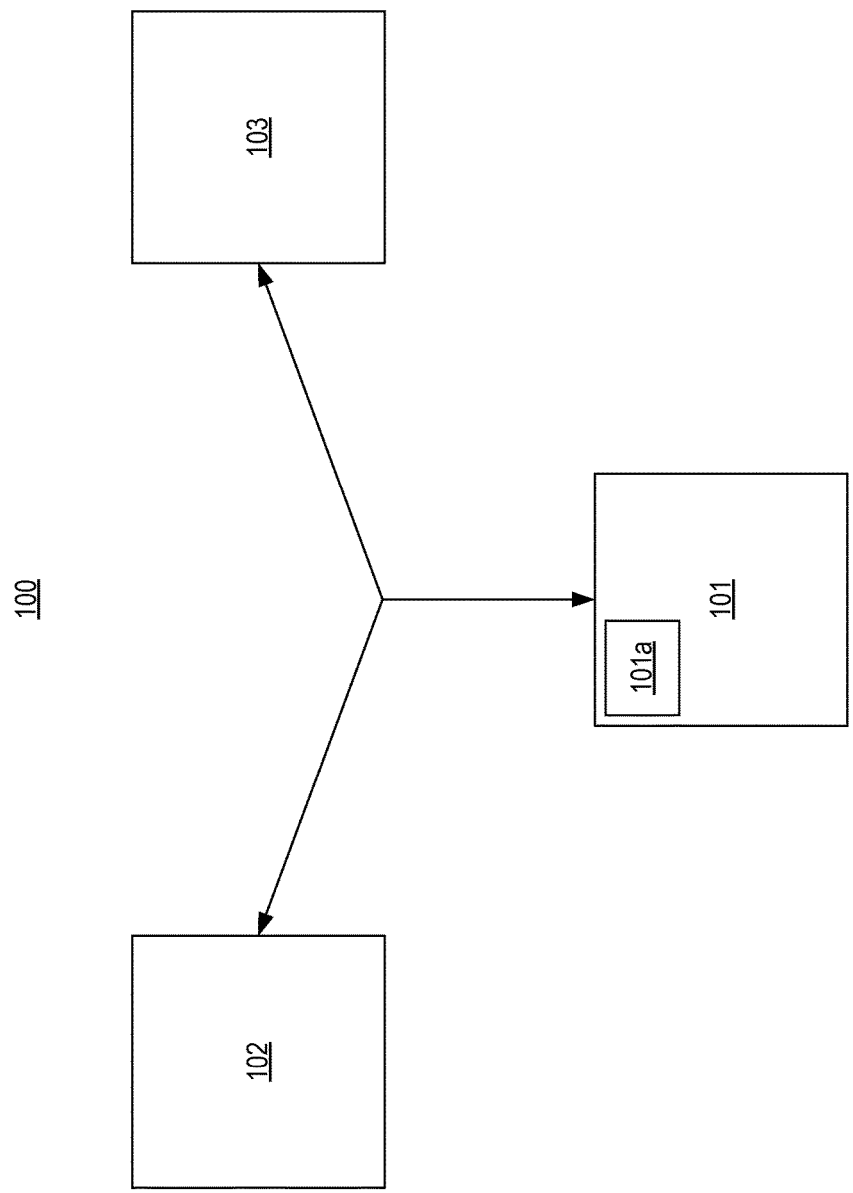
FIG. 1 illustrates an example computing environment in which a risk engine is employed as part of an access manager solution to evaluate a user's attempt to access a managed application.

FIG. 1 illustrates an example computing environment 100 in which the present invention may be implemented. Computing environment 100 includes an access manager solution 101 of which a risk engine 101a is a component, an application server 102, and a user computing device 103. Application server 102 can generally represent the computing components employed to host a web-accessible application. Therefore, application server 102 should not be construed as being limited to a single server device, but should be construed as encompassing any number of computing components including those used to host a cloud-based application. Also, although not shown, in a typical environment, more than one application server may be employed to host a company's web-accessible applications and many different user computing devices may be used to access such applications.

User computing device 103 can represent any of a number of different types of devices by which a user can access an application hosted by application server 102. For example, user computing device 103 can represent a user's desktop computer, laptop computer, mobile device, etc.

As a non-limiting example, access manager solution 101 can provide a number of access control functions to one or more applications hosted on application server 102 including authentication, provisioning, federation, authorization, and auditing. An example of an access manager solution in which the present invention may be implemented is Dell Inc.'s Cloud Access Manager. It is noted, however, that the present invention also extends to embodiments where risk engine 101a may be independently implemented outside of an access manager solution. Accordingly, even though the present invention will primarily be described with reference to an example implementation in which risk engine 101a is a component of access manager solution 101, the claims should be construed as applying to any computing environment in which a risk engine is employed to evaluate an attempt to access a web-accessible application.

In typical implementations, access manager solution 101 can be configured as an intermediary between user computing device 103 and application server 102 to perform access control on attempts to access applications hosted on application server 102. For example, a user may employ a browser to access an interface provided by access manager solution 101 through which the user can provide user credentials for authentication purposes. After the user is authenticated, access manager solution 101 may redirect the user to a particular application or to a portal through which the application can be accessed. It is noted, however, that the particular manner in which the user attempts to access an application is not essential to the invention.

Figure 2:
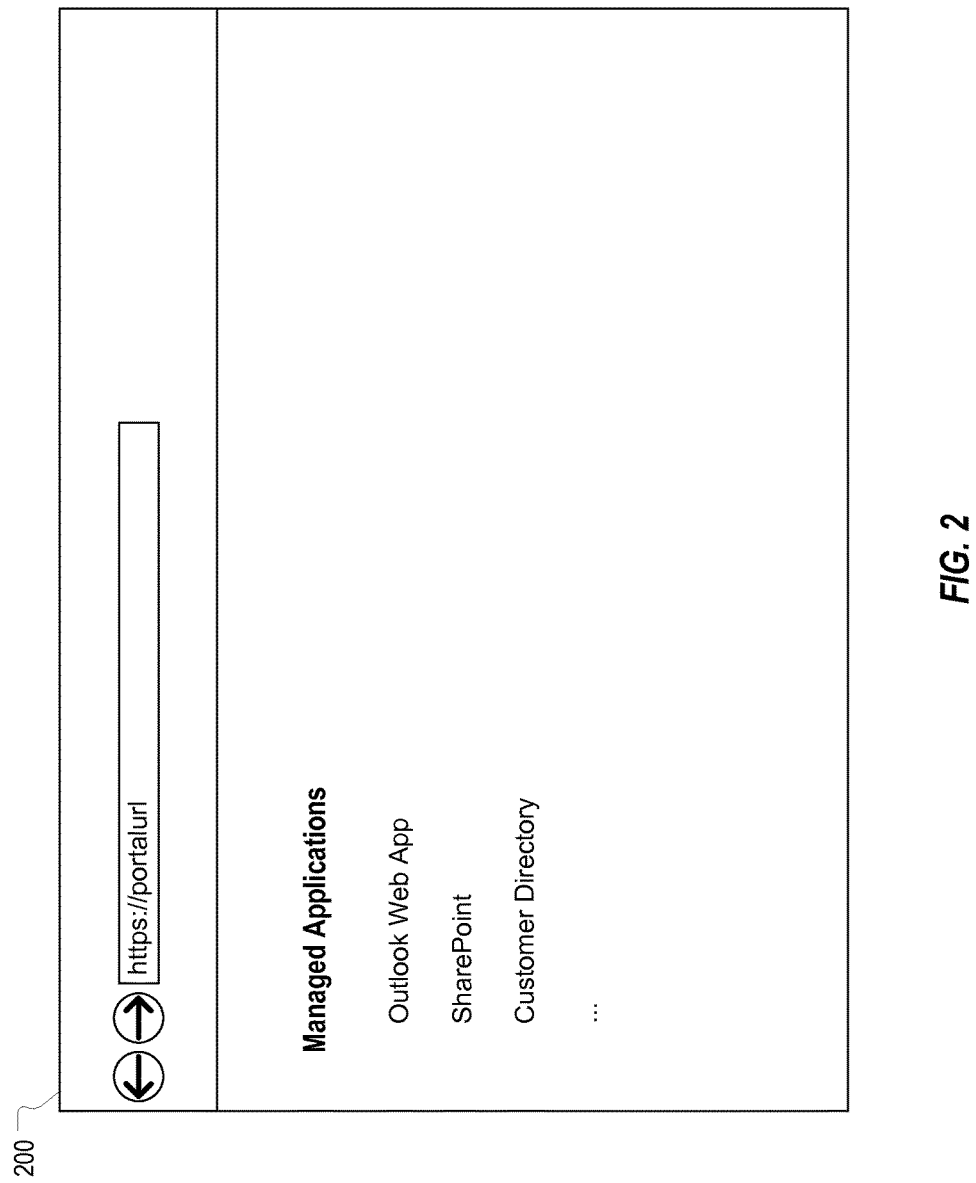
FIG. 2 illustrates an example portal that an access manager can provide to allow a user to access a managed application.

For purposes of illustrating a typical scenario in which the present invention may be implemented, FIG. 2 depicts an example web-based portal 200 which may be provided by access manager solution 101 to user computing device 103 to allow a user of the device to access an application. As shown, portal 200 is in the form of a webpage to emphasize that risk engine 101a functions to authorize access to web-accessible applications. In some cases, portal 200 may be displayed after the user has provided appropriate credentials to authenticate with access manager solution 101 (which, for example, may implement single sign-on for any managed applications). Alternatively, portal 200 may be displayed prior to performing any authentication steps. In any case, portal 200 allows the user to select to access a number of applications including, as shown, an Outlook Web application, a SharePoint application, a Customer Directory application, etc.

It is again emphasized that the present invention can be implemented when an access manager solution is not employed. For example, user computing device 103 may directly access a login screen of an application hosted by application server 102. In such cases, the application can request that risk engine 101*a* evaluate the attempt to access the application (e.g., as part of the process of authenticating the user or as a separate process).

Regardless of the particular configuration of the computing environment or the timing when risk engine 101*a* performs its evaluation of an access attempt (e.g., before, during, or after an authentication process), risk engine 101*a* can perform an evaluation of the attempt to access an application to determine the risk of allowing the access.

Figure 3B:
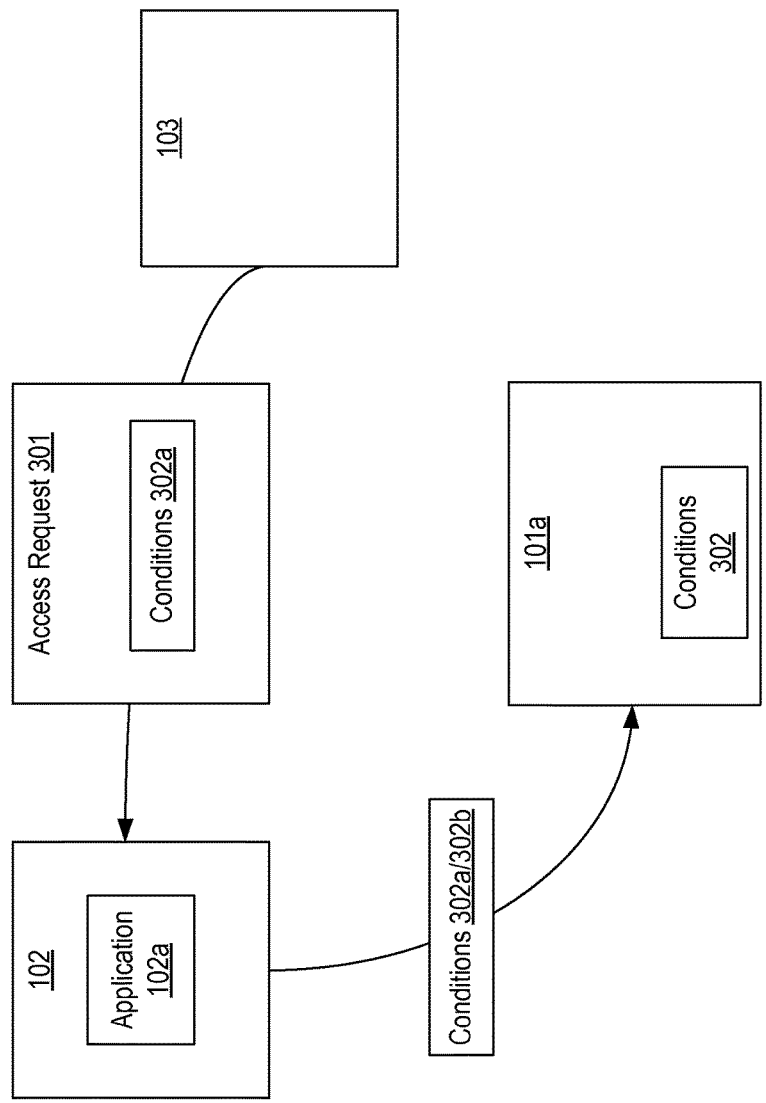
FIG. 3B illustrates an example of how an access request can be evaluated when a risk engine is employed independently of an access manager.

FIGS. 3A and 3B each depict an example of how this evaluation can be initiated in an environment where the risk engine is part of an access manager and in an environment where the risk engine is independent of an access manager respectively. As shown in FIG. 3A, user computing device 103 has submitted an access request 301 for accessing an application 102*a* hosted by application server 102. In many cases, access request 301 can represent an HTTP request that is generated when the user of user computing device 103 provides some input into a browser indicating that the user would like to access application 102*a* (e.g., by entering a corresponding URL or selecting a corresponding link such as a link provided in portal 200). In some instances, access request 301 can comprise a request to authenticate a user to access application 102*a* and potentially one or more other applications.

Because access manager 101 is employed and may govern access to a number of different applications, access request 301 is shown as including an identifier of application 102*a* (which may be, for example, a URL) as well as conditions 302*a*. Conditions 302*a* generally represent a number of different conditions or characteristics of access request 301. For example, conditions 302*a* can include an identification of the type of browser used to submit the request and an IP address from which the request is received. Conditions 302*a* can be extracted from request 301 and provided to risk engine 101*a* for use in generating risk scores as will be described below. Additional conditions can be generated (e.g., by access manager 101, risk engine 101*a*, or another component) in response to receiving access request 301 or based on conditions 301*a*. For example, risk engine 101*a* is shown as storing conditions 302 which include conditions 302*a* that are obtained directly from request 301 as well as additional conditions such as a type of authentication that was or will be performed (which may be obtained in various ways such as from previous interactions with risk engine 101*a* or an associated system or from information contained within access request 301), a time when the request is received, a country or location from which the request originated (which may be derived using the IP address of the request), a group to which the associated user belongs (which may be obtained based on authentication information contained in or known about access request 301), a last time that the user logged on to the application or an associated application (which may also be obtained based on authentication information contained in or known about access request 301), etc. Accordingly, conditions 302 generally represent information that can be obtained directly from access request 301 or derived from information contained within or associated with access request 301. Importantly, conditions 302 may contain historical information stored by risk engine 101*a* and/or obtained from other sources (e.g., user or IP address activity history from firewall logs or other sources).

In instances where risk engine 101*a* is not employed in an access manager environment, conditions 302 can still be obtained as shown in FIG. 3B. In such cases and as described above, conditions 302*a* obtained directly from access request 301 can be provided to risk engine 101*a* by application 102*a* (e.g., as part of a request for a total risk score for access request 301). In some cases, application 102*a* may derive additional conditions 302*b* from information contained within or associated with access request 301 and provide such conditions to risk engine 101*a*. Further conditions may also be obtained and/or derived by risk engine 101*a*. Regardless of how conditions 302 are obtained/derived, risk engine 101*a* obtains conditions 302 to enable the evaluation of access request 301.

In accordance with one or more embodiments of the present invention, risk engine 101*a* can perform a process for producing a total risk score for access request 301 based on conditions 302 and an appropriate risk policy (which, in some embodiments, may be identified using the identifier of application 102*a* contained in access request 301). Risk engine 101*a* can then provide the total risk score to access manager 101*a* (if one is used) or to application 102 to allow the access manager or application to determine whether to authorize the access.

The total risk score can be generated as a probability (i.e., a percentage) representing the likelihood that the access request is illegitimate (e.g., that someone other than the legitimate user is attempting to access the application). By generating the total risk score as a probability, a more accurate representation of the actual risk can be employed to govern access to the application.

The total risk score can be calculated by first generating a number of risk factors and mitigating factors based on the conditions or characteristics of the corresponding access request. For example, some of conditions 302 may be considered as risk factors, whereas others of conditions 302 may be considered as mitigating factors to apply to one or more of the risk factors.

Figure 4:
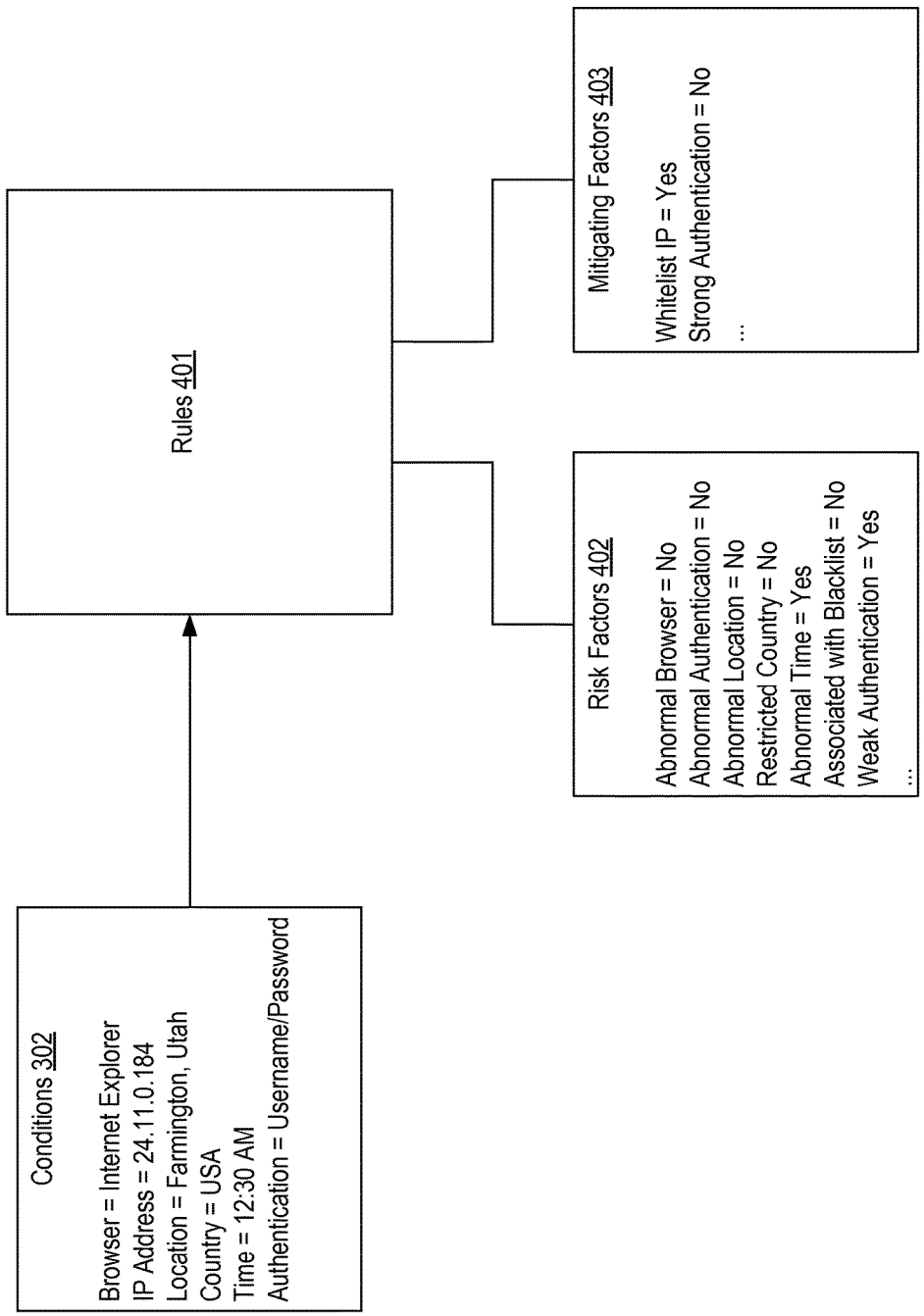
FIG. 4 illustrates an example of how a risk engine can employ rules to identify the presence of risk factors and mitigating factors within an access request based on conditions or characteristics of the access request.

FIG. 4 provides an example of how risk factors and mitigating factors can be generated from conditions 302. In this example, it is assumed that access request 301 was made from IP address 24.11.0.184 using Internet Explorer at 12:30 AM and that the request is for access to application 102*a*. It is also assumed that this IP address is located in Farmington, Utah, USA, and that the user has been or will be authenticated using a username and password.

Risk engine 101*a* can include rules 401 which are configured to generate risk factors 402 and mitigating factors 403 based on conditions 302. In typical instances, rules 401 are specific to the application for which access is being requested (which in this case is application 102*a*). However, in other instances, rules 401 (or at least a portion of rules 401) may apply to multiple applications.

Rules 401 can define a number of normal conditions for access requests. In some instances, these normal conditions can be specific to the user, while in others they may be specific to a group of users or to an entire organization. For example, rules 401 can define a normal browser that is used to access application 102*a*, a normal mode of authentication, a normal location (e.g., where the user is typically located when accessing application 102*a*), a normal time (e.g., when the user typically accesses application 102*a*), etc. Rules 401 can also define restrictions such as a list of risky countries, a list of risky IP addresses, etc. Rules 401 may also define characteristics of applications such as a type of application (e.g., whether the application provides access to sensitive data), a user's role within an application (e.g., whether the user would have elevated access privileges within the application), etc. Rules 401 may also define further characteristics such as whether the mode of authentication is strong or weak. Rules 401 may also define historical characteristics associated with the request such as firewall data indicating a last time that the user logged on or identifying other requests from the same IP address or whether the IP address is known to be associated with malware, etc. In short, rules 401 can include any functionality for evaluating any characteristic or condition associated with an access request.

In the example of FIG. 4, rules 401 are shown as generating a set of risk factors 402 that include an abnormal browser factor, an abnormal authentication factor, an abnormal location factor, a restricted country factor, an abnormal time factor, an associated with blacklist factor, and a weak authentication factor among various other possible factors. As shown, based on conditions 302, rules 401 may indicate that Internet Explorer is a normal browser for this user and that this user typically uses a username and password to authenticate when accessing application 102a. Similarly, rules 401 may indicate that the user normally accesses application 102a while in Farmington, Utah, that USA is not a restricted country, and that the IP address is not on the blacklist. In contrast, rules 401 may indicate that it is abnormal for the user to access application 102a at 12:30 AM and that a username and password is a weak mode of authentication.

Mitigating factors 403 are generated in a similar manner. As shown, rules 401 have indicated that the IP address 24.11.0.184 is on the whitelist and that strong authentication was not used.

Once risk factors 402 and mitigating factors 403 have been generated, risk engine 101a can generate the total risk score based on these factors. As indicated above, the total risk score can be generated as a percentage defining the probability that the access request is illegitimate. The present invention provides a way to both represent and combine each risk factor in a manner that facilitates the generation of such a percentage while also maintaining the customizability of the generation of total risk score.

Figure 5:
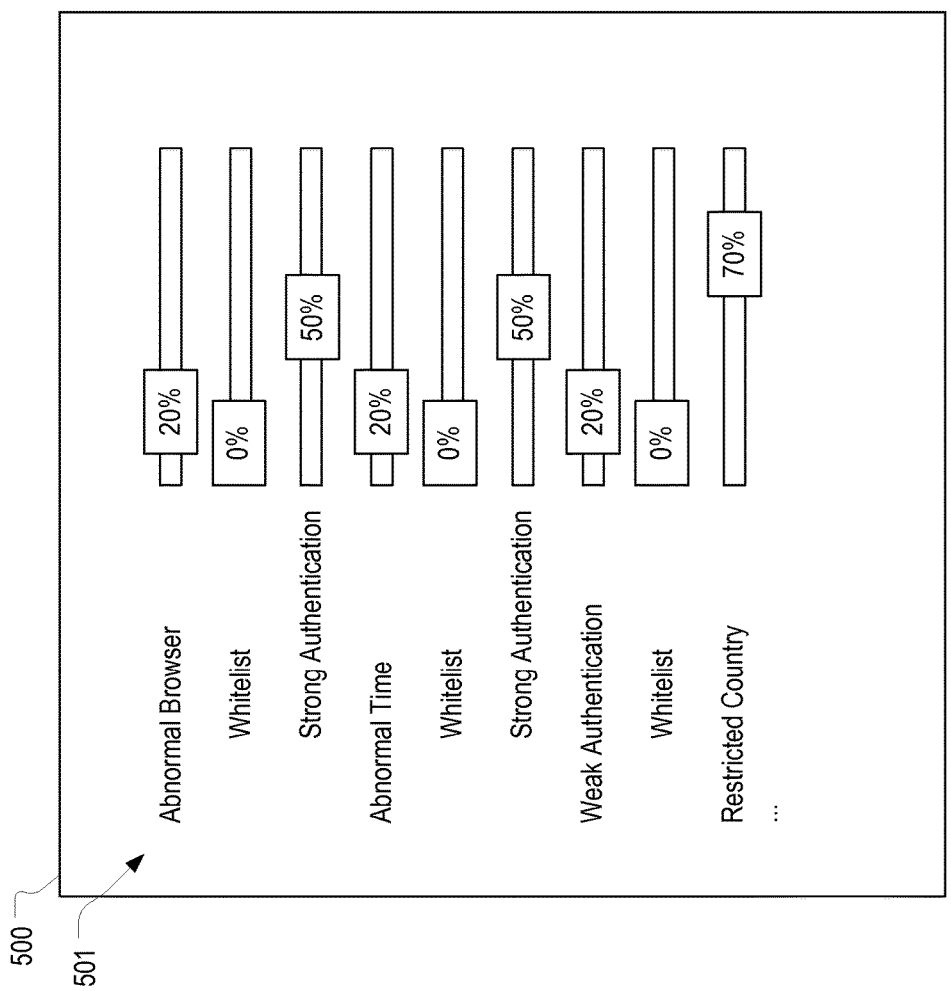
FIG. 5 illustrates an example interface that can be displayed to allow an administrator to define a risk policy for a particular managed application.

FIG. 5 provides an example of how risk factors and corresponding mitigating factors can be assigned a particular percentage by using a risk policy. FIG. 5 depicts a user interface 500 that could be displayed to an administrator that manages application 102a to allow the administrator to define a risk policy for a particular application. For example, the administrator can employ user interface 500 to define a risk policy 501 for application 102a which will then be used to evaluate subsequent requests to access the application. It is noted that rules 401 can be part of the risk policy for the particular application. In other words, an administrator can create a risk policy for each application that defines how risk factors and mitigating factors are identified as well as what percentages will be assigned to each factor.

User interface 500 lists each risk factor (only four of which are shown) in conjunction with any mitigating factor that applies to the particular risk factor. For example, the abnormal browser factor is listed in conjunction with the whitelist factor and the strong authentication factor. As such, both the whitelist factor and the strong authentication factor are defined as mitigating factors that apply to the abnormal browser risk factor in order to reduce the percentage assigned to the abnormal browser risk factor. In contrast, the weak authentication risk factor is only displayed in conjunction with the whitelist factor (since the strong authentication factor would never be applied to mitigate this risk factor) while the restricted country risk factor is not displayed with any mitigating factors (since, for example, access from a restricted country may be viewed as risky regardless of any mitigating factors that may exist). A similar arrangement may exist for any other risk factor to be considered when generating the total risk score.

Each factor is also displayed with a slider that can facilitate the selection of a particular percentage to be applied to the corresponding factor. For example, the slider for each of the abnormal browser, abnormal time, and weak authentication risk factors is set to 20% thereby indicating that these risk factors, when present in a request, should be set to 20% for purposes of generating the total risk score. Similarly, for both the abnormal browser and abnormal time risk factors, the whitelist and strong authentication factors should be assigned a percentage of 0% and 50% respectively for purposes of mitigating the percentage assigned to the corresponding risk factor. Accordingly, risk policy 501 can be viewed as comprising the percentage that is assigned to each factor and the definition of which mitigating factors apply to each risk factor.

To summarize, after an administrator has defined a risk policy for a particular application, that risk policy can be employed to obtain the percentages to be assigned to the risk factors and mitigating factors that are present within an attempt to access the particular application. With reference to the example in FIGS. 3-5, once risk factors 402 and mitigating factors 403 are identified (i.e., once risk engine 101a has identified which factors are present within the access request), risk engine 101a can employ risk policy 501 to assign the appropriate percentage to each factor. Once these percentages are assigned, the risk factors can be employed to generate the total risk score.

Prior to proceeding to a discussion of the equation for generating the total risk score, it is noted that the equation provided below is intended to summarize the process of combining risk factors to yield the total risk score. The exact structure of the equation is not important and other structures of the equation can easily be derived which would yield the same result.

The total risk score can be generated in accordance with the following equation:

$$\text{Total Risk Score} = b_{n-2} + (1-b_{n-2})*a_n$$

where $a_n$ represents the nth risk factor after it is adjusted by any applicable mitigating factors and $b_{n-2}$ is obtained from the following formula(s):

$$b_{n-2} = b_{n-3} + (1-b_{n-3})*a_{n-1}$$

$$b_{n-3} = b_{n-4} + (1-b_{n-4})*a_{n-2}$$

. . .

$$b_1 = a_1 + (1-a_1)*a_2$$

Accordingly, this equation generates the total risk score in a recursive manner by combining two variables to produce an intermediate result and then combining the intermediate result with another variable in a recursive manner until all variables have been combined.

Within this equation, any variable a, prior to being combined, can be modified by its applicable mitigating factors in accordance with the following formula:

$$a_n = a_n * m_1 * m_2 \ldots * m_n$$

where m represents the mitigating factor. In other words, a risk factor is mitigated by multiplying it by any applicable mitigating factors. Since each factor is a percentage, the multiplication by the mitigating factor(s) reduces the percentage of the risk factor.

In simple terms, the equation for generating the total risk score functions by summing together each risk factor in a manner that will always produce a percentage between 0% and 100% where 0% represents minimum risk and 100% represents maximum risk. In this manner, the total risk score can be easily interpreted and accurately reflects the actual risk of a particular request. It is noted that the order in which risk factors (i.e., the a variables) are combined is not important. The same is true of intermediate values (i.e., the b variables).

The following example illustrates how a total risk score can be generated by applying risk policy 501 to risk factors 402 and mitigating factors 403. For purposes of this example, only the factors displayed in FIG. 5 will be considered in the calculation.

From the equations above, it can be seen that any risk factor that is not present (e.g., that is assigned "no" in FIG. 4) will have no effect on the calculation of the total risk score. This is because the percentage that would be assigned to such non-present risk factors would be zero. Therefore, only the risk factors that are present in the request will be considered in this example.

In this example, only the abnormal time and weak authentication risk factors are present. Accordingly, based on risk policy 501, risk engine 101*a* can create a first variable $a_1$ with a value of 0.20 representing a 20% risk due to the fact that access request 301 was received at an abnormal time. Similarly, risk engine 101*a* can create a second variable $a_2$ with a value of 0.20 representing a 20% risk due to the fact that weak authentication was used. Risk engine 101*a* may also create a variable $m_1$ with a value of 0.00 representing a 0% risk because access request 301 was made from a whitelisted IP address.

Prior to employing the risk factors (variables $a_1$ and $a_2$) to calculate the total risk score, each risk factor is adjusted based on any applicable mitigating factors. In this example, the whitelist mitigating factor is applicable to both risk factors. Therefore, both variables $a_1$ and $a_2$ can be multiplied by 0.00 which would yield zero for each risk factor. Because all risk factors are zero in this example, the total risk score would also be zero. Application 102*a* (or access manager 101) could therefore authorize access request 301. In this example, due to the equation employed to generate the total risk score, the whitelist mitigating factor functions as a trump that offsets any risk factor to which it applies.

To provide another example, it is assumed that the following risk factors are present in an access request: abnormal browser, abnormal time, and weak authentication, while no mitigating factors are present. In this case, for the purposes of illustration, it will be assumed that an applicable risk policy assigns 20% to the abnormal browser risk factor, 25% to the abnormal time risk factor, and 30% to the weak authentication risk factor. Accordingly, $a_1$ would equal 0.20, $a_2$ would equal 0.25, and $a_3$ would equal 0.30. The calculation of the total risk score would therefore be as follows:

$$b_1 = 0.20 + (1-0.20)*0.25 = 0.40$$

Total Risk Score=0.40+(1−0.40)*0.30=0.58=58%

Accordingly, based on the example risk policy, an access request made from an abnormal browser, at an abnormal time, and using weak authentication would be assigned a total risk score of 58%. Although not depicted in the figures, the risk policy could also define thresholds at which access will not be authorized (e.g., any access request having a total risk score over 70% will be blocked) or at which access will only be allowed with additional authentication (e.g., by requiring strong authentication (which in essence would act as a trump in the evaluation of a subsequent request)).

From the above discussion, it can be seen that the total risk score will be at least as big as the largest percentage assigned to a risk factor (after any mitigating factors are applied). For example, with reference to FIG. 5, if the restricted country risk factor is present (and assuming no mitigating factors apply to the restricted country risk factor), a variable with a value of 0.70 will be employed in the calculation. If no other risk factors were present, the total risk score for the request would still be 70%. Accordingly, the present invention makes it simple and straightforward to designate risk factors that should trump all other factors. For example, if the threshold for denying access is set at 65%, any request made from a restricted country would always be denied. The same is true with mitigating factors. For example, to ensure that a particular condition (e.g., whitelist IP address) may always guarantee authorization, the whitelist mitigating factor can be set to 0% and defined as being applicable to all risk factors. In such cases, regardless of which risk factors may be present in a request, if the request is made from a whitelisted IP address, the total risk score would be 0%.

Accordingly, the present invention allows an administrator to easily understand how to control access to managed applications at a very granular level. User interface 500 allows the administrator to quickly and easily define how risky a particular factor should be including how the factor can be mitigated. Further, the process of combining risk factors preserves this defined amount of risk in a straightforward manner thereby enabling an application or an access manager to more accurately and efficiently determine whether to authorize a particular access request.

Also, although the total risk score is generated as a percentage between 0% and 100%, in some embodiments, this percentage may subsequently be scaled to a value that can be consumed by a particular application. For example, some applications may be configured to consume a risk score that is on a scale from 0-7. In such cases, the total risk score generated by risk engine 101 can be multiplied by 7 to yield a value within the expected range. Accordingly, the present invention can easily be configured to interface with existing systems.

Figure 6:
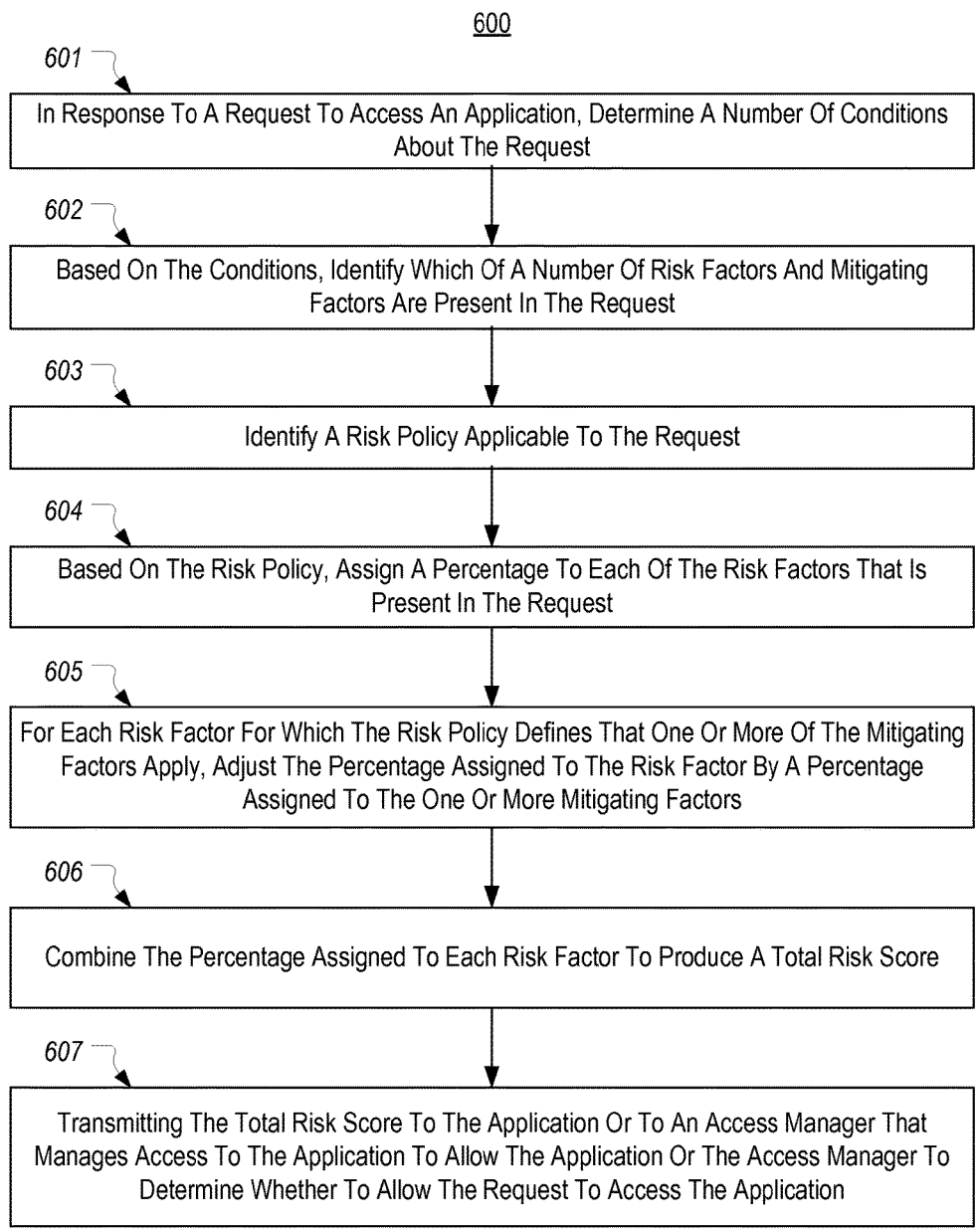
FIG. 6 illustrates a flowchart of an example method for combining a set of risk factors to produce a total risk score within a risk engine.

FIG. 6 illustrates a flowchart of an example method 600 for combining a set of risk factors to produce a total risk score within a risk engine. Method 600 will be described with reference to FIGS. 3-5.

Method 600 includes an act 601 of determining a number of conditions about a request to access an application. For example, risk engine 101*a* can determine conditions 302 based on information contained within, associated with, or derived from access request 301.

Method 600 includes an act 602 of identifying, based on the conditions, which of a number of risk factors and mitigating factors are present in the request. For example, risk engine 101*a* can employ rules 401 to identify risk factors 402 and mitigating factors 403.

Method 600 includes an act 603 of identifying a risk policy applicable to the request. For example, risk engine 101*a* can determine that risk policy 501 is applicable to requests to access application 102*a*.

Method 600 includes an act 604 of assigning, based on the risk policy, a percentage to each of the risk factors that is present in the request. For example, risk engine 101a can identify a percentage specified in risk policy 501 for each risk factor present in access request 301.

Method 600 includes an act 605 of, for each risk factor for which the risk policy defines that one or more of the mitigating factors apply, adjusting the percentage assigned to the risk factor by a percentage assigned to the one or more mitigating factors. For example, risk engine 101a can employ risk policy 501 to identify which mitigating factors apply to which risk factors and adjust the percentage assigned to such risk factors by the percentage assigned to the applicable mitigating factors.

Method 600 includes an act 606 of combining the percentage assigned to each risk factor to produce a total risk score. For example, risk engine 101a can generate a total risk score in accordance with the example equation given above.

Method 600 includes an act 607 of transmitting the total risk score to the application or to an access manager that manages access to the application to allow the application or the access manager to determine whether to allow the request to access the application. For example, risk engine 101a can send the total risk score to application 102a or to access manager 101.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A computer method, implemented using one or more hardware processors by a risk engine that is configured to evaluate attempts to access a web-accessible application, for generating a total risk score representing a risk of authorizing an attempt to access the application, the method comprising:

in response to a user's web-based request to access the web-accessible application, determining a number of conditions about the request;

based on the conditions, identifying which of a number of risk factors and mitigating factors are present in the request to access the web-accessible application;

identifying a risk policy applicable to the request to access the web-accessible application;

based on the risk policy, assigning a percentage to each of the risk factors that is present in the request to access the web-accessible application;

for each risk factor for which the risk policy defines that one or more of the mitigating factors apply, adjusting the percentage assigned to the risk factor by a percentage assigned to the one or more mitigating factors;

combining the percentage assigned to each risk factor to produce a total risk score in accordance with the following equation:

$$\text{Total Risk Score} = b_{n-2} + (1 - b_{n-2})*a_n$$

where $a_n$ represents the nth risk factor after it is adjusted by any applicable mitigating factors and $b_{n-2}$ is obtained from the following formula(s):

$$b_{n-2} = b_{n-3} + (1 - b_{n-3})*a_{n-1}$$

$$b_{n-3} = b_{n-4} + (1 - b_{n-4})*a_{n-2}$$

. . .

$$b_1 = a_1 + (1 - a_1)*a_2; \text{ and}$$

transmitting, using the one or more hardware processors, the total risk score to the application or to an access manager that manages access to the application to allow the application or the access manager to determine whether to allow the request to access the web-accessible application.

2. The method of claim 1, wherein the percentage assigned to each risk factor is combined in a manner that produces the total risk score as a percentage between 0% and 100%.

3. The method of claim 1, wherein adjusting the percentage assigned to the risk factor by the percentage assigned to the one or more mitigating factors comprises multiplying the percentage assigned to the risk factor by the percentage assigned to the one or more mitigating factors.

4. The method of claim 1, wherein determining a number of conditions about the request comprises extracting information contained in the request.

5. The method of claim 4, wherein the information contained in the request includes one or more of:
- a browser used to submit the request;
- an IP address from which the request was sent; or
- a user that submitted the request.

6. The method of claim 1, wherein determining a number of conditions about the request comprises generating one or more conditions based on information contained within the request.

7. The method of claim 6, wherein the one or more conditions include one or more of:
- a type of browser used to submit the request;
- a time when the request is submitted;
- a type of authentication employed in conjunction with the request;
- a location from which the request is received;
- a user that submitted the request;
- a group to which the user belongs; or
- a last time that the user logged on.

8. The method of claim 7, wherein the number of risk factors includes one or more of:
- an abnormal browser risk factor;
- an abnormal mode of authentication risk factor;
- an abnormal location risk factor;
- an abnormal time risk factor
- a risky country risk factor;
- a weak authentication risk factor;
- an IP blacklist risk factor;
- a malware risk factor; or
- a historical behavior risk factor.

9. The method of claim 7, wherein the number of mitigating factors includes one or more of:
- an IP whitelist mitigating factor; or
- a strong authentication mitigating factor.

10. The method of claim 1, wherein the percentage assigned to at least one of the mitigating factors varies based on which risk factor the mitigating factor applies to.

11. The method of claim 1, wherein at least some of the risk factors are identified by comparing one or more conditions about the request to rules which define normal conditions of requests to access the web-accessible application.

12. The method of claim 11, wherein the rules define normal conditions for a particular user.

13. The method of claim 1, wherein the total risk score is transmitted to an access manager and wherein, the method further comprises, determining, by the access manager and based on the total risk score and the risk policy, whether to authorize the request to access the web-accessible application by comparing the total risk score to a threshold defined in the risk policy such that when the total risk score exceeds the threshold, the request to access the web-accessible application is not authorized.

14. A risk engine comprising:
- one or more hardware processors; and
- one or more non-transitory computer storage media storing:
  - a risk policy for a first web-accessible application that is managed by the risk engine, the risk policy identifying a number of risk factors and a percentage that is assigned to each of the risk factors, the risk policy further identifying, for at least one of the risk factors, one or more mitigating factors that apply to the risk factor and a percentage that is assigned to each of the one or more mitigating factors;
  - rules for identifying, for each of at least some requests to access the first web-accessible application, whether any of the risk factors or mitigating factors are present within the request; and
  - computer executable instructions configured to generate a total risk score for the at least some requests to access the first web-accessible application by performing the following for each of the at least some requests:
    - identifying conditions of the request;
    - applying the rules to the conditions to identify which risk factors and mitigating factors are present within the request;
    - applying the risk policy to the identified risk factors and mitigating factors such that the corresponding percentage is assigned to each risk factor, and the percentage assigned to each risk factor is modified by the corresponding percentage assigned to any mitigating factor that applies to the risk factor; and
    - combining the percentages assigned to each risk factor to generate the total risk score as a percentage that represents the risk of authorizing the request, wherein the total risk score is generated in accordance with the following equation:

$$\text{Total Risk Score} = b_{n-2} + (1 - b_{n-2}) * a_n$$

where $a_n$ represents the nth risk factor after it is adjusted by any applicable mitigating factors and $b_{n-2}$ is obtained from the following formula(s):

$$b_{n-2} = b_{n-3} + (1 - b_{n-3}) * a_{n-1}$$

$$b_{n-3} = b_{n-4} + (1 - b_{n-4}) * a_{n-2}$$

. . .

$$b_1 = a_1 + (1 - a_1) * a_2.$$

15. The risk engine of claim 14, wherein the total risk score is generated as a percentage between 0% and 100%.

16. One or more non-transitory computer storage media storing computer executable instructions which when executed by one or more processors implement a method for generating a total risk score, the method comprising:
- receiving, from a user computing device, a browser-based request to access a web-accessible application;
- evaluating the request to determine whether to authorize the request, the evaluation including:
  - identifying a number of risk factors, the risk factors including:
    - whether the request was submitted using an abnormal browser;
    - whether the request was submitted at an abnormal time; and
    - whether the request was submitted from an abnormal location;
  - identifying a number of mitigating factors, the mitigating factors including:
    - whether the request was received from a whitelisted IP address; and
    - whether strong authentication was employed in conjunction with the request;
  - accessing a risk policy to identify a percentage of risk to be applied to each identified risk factor, a percentage of mitigation to be applied to each mitigating factor, and to which risk factors any of the mitigating factors apply;
  - for any risk factor to which any of the mitigating factors apply, reducing the percentage assigned to the risk factor using the percentage assigned to any mitigating factor that applies; and combining the percentages assigned to the risk factors to generate a total risk score as a percentage representing a total risk of authorizing the request, wherein the total risk score is generated in accordance with the following equation:

$$\text{Total Risk Score} = b_{n-2} + (1-b_{n-2})*a_n$$

where $a_n$ represents the nth risk factor after it is adjusted by any applicable mitigating factors and $b_{n-2}$ is obtained from the following formula(s):

$$b_{n-2} = b_{n-3} + (1-b_{n-3})*a_{n-1}$$

$$b_{n-3} = b_{n-4} + (1-b_{n-4})*a_{n-2}$$

$$\ldots$$

$$b_1 = a_1 + (1-a_1)*a_2.$$

17. The computer storage media of claim 16, wherein the risk factors include one or more of:
- whether abnormal authentication was employed in conjunction with the request;
- whether the request was received from a blacklisted IP address;
- whether the request was received from a restricted country;
- whether the request was received from an IP address associated with malware;
- whether the web-accessible application provides access to sensitive content;
- whether the request will allow elevated access within the web-accessible application;
- whether a user associated with the request is a member of a group; or
- whether a duration of time since a user associated with the request last accessed the web-accessible application exceeds a defined threshold.

* * * * *